March 5, 1968  S. F. BRADER, SR., ET AL  3,371,891
LOADING, CONVEYING AND EJECTING MECHANISM FOR AIRCRAFT
Filed Sept. 16, 1965  3 Sheets-Sheet 3

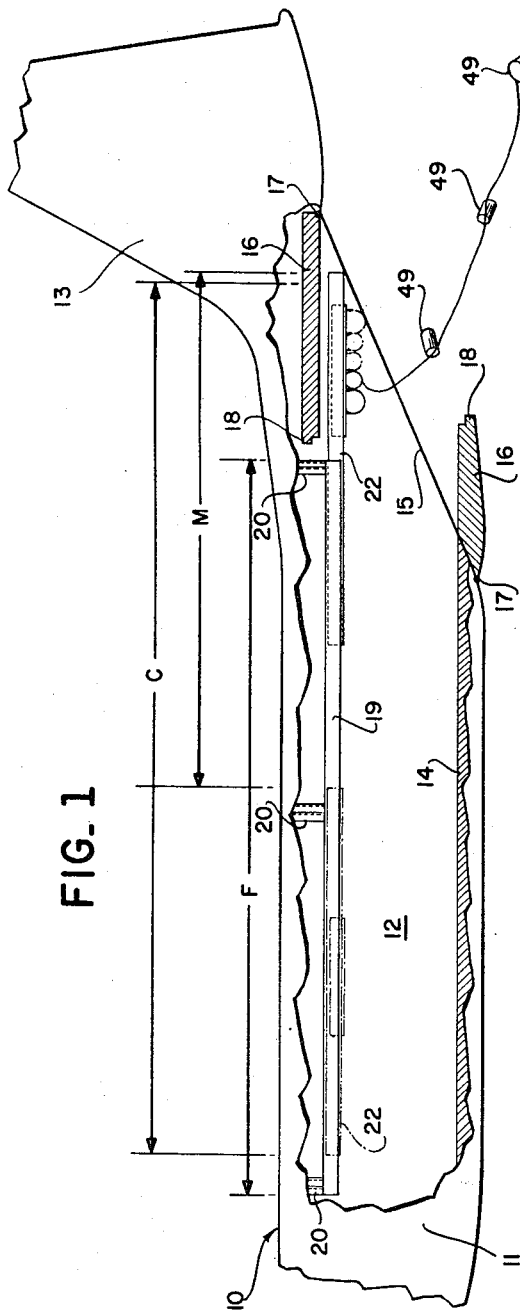
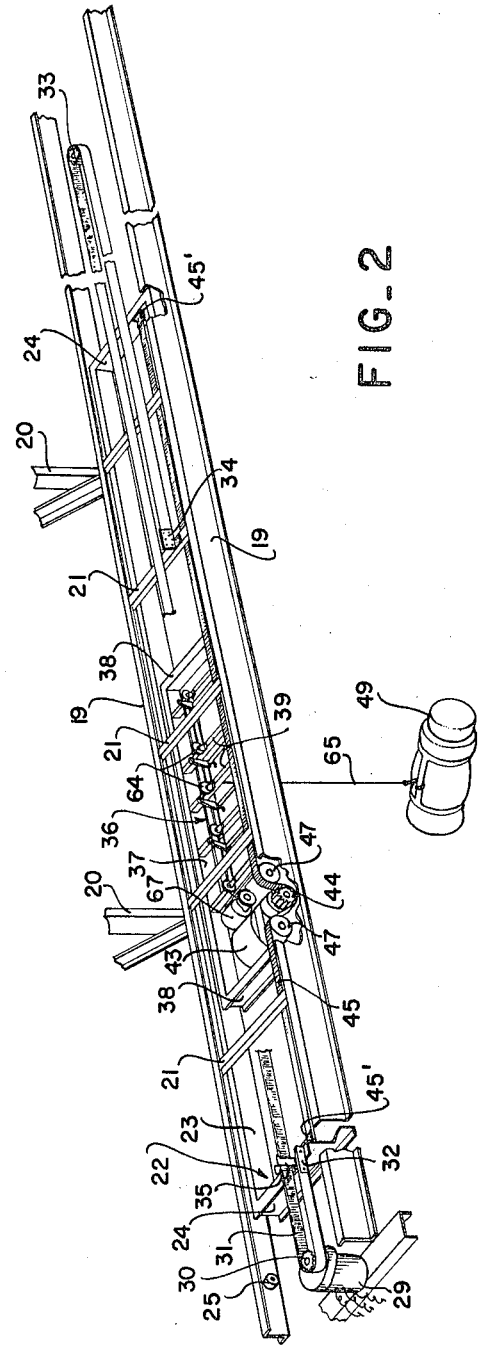
INVENTORS
STANLEY F. BRADER, SR.
CHARLES L. KUHN
OLIVER F. SNOW
BY
*George C. Sullivan*
Agent

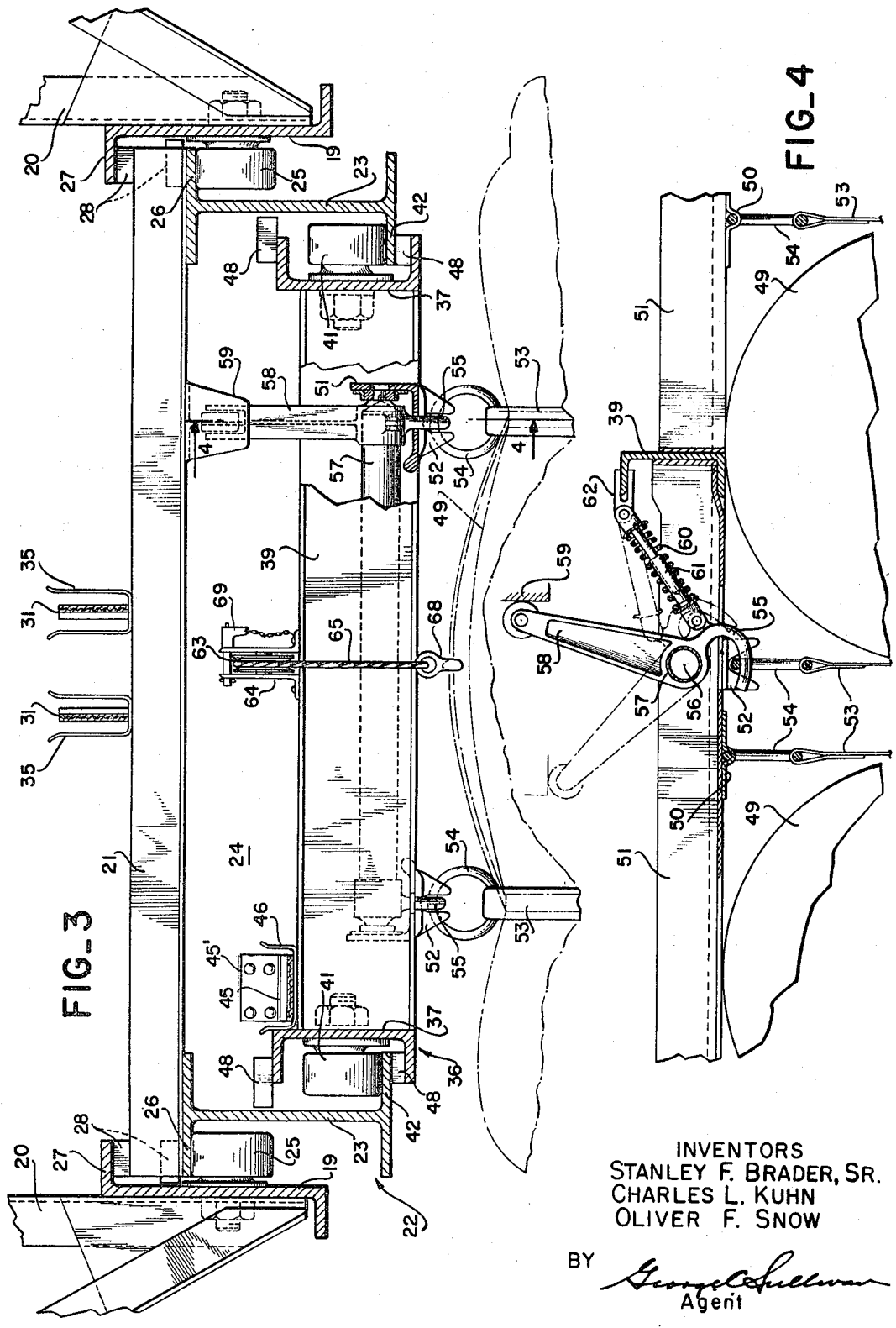

INVENTORS
STANLEY F. BRADER, SR.
CHARLES L. KUHN
OLIVER F. SNOW
BY George Sullivan
Agent 3,371,891
LOADING, CONVEYING AND EJECTING MECHANISM FOR AIRCRAFT
Stanley F. Brader, Sr., and Charles L. Kuhn, Marietta, and Oliver F. Snow, Atlanta, Ga., assignors to Lockheed Aircraft Corporation, Los Angeles, Calif.
Filed Sept. 16, 1965, Ser. No. 487,676
10 Claims. (Cl. 244—137)

ABSTRACT OF THE DISCLOSURE

This system provides a structurally sound and stable extensible and retractable aerial delivery conveyor within an aircraft cargo compartment. The entire assembly is mounted in the aircraft overhead structure thereby providing a clear, unobstructed cargo compartment. Means is provided for hoisting and conveying desired bundles from strategically located storage bins in the cargo compartment of the delivery position beyond the cargo ramp and automatically release them in sequence at a predetermined time interval without the use of conventional floor rollers or extraction chutes.

---

This invention relates to aerial delivery systems, i.e., apparatus for releasing or jettisoning stores from aircraft during flight, and more particularly to such a system that includes a loading, conveying and ejecting mechanism by which stores, including cargo and the like, carried by and internally of the aircraft are removed from a storage area within the aircraft to a delivery station substantially externally of the aircraft and jettisoned.

In aerial delivery operations it is axiomatic that a clean and positive separation of the cargo from the aircraft be made and the prior art is replete with apparatuses directed to this end. Cargo type aircraft, i.e., those having internal compartments to contain the cargo and from which such cargo must be removed during flight through appropriate openings such as bomb bays and the like to accomplish aerial deliveries, are required to be versatile both in the various and sundry cargo or packages they deliver and in their flight performance. Thus, these aircraft must be designed to have good aerodynamic characteristics for relatively high speed, maneuverability, etc., with a maximum internal cargo area and at the same time impose no undue loading and package problems of maximum cargo or payload into the aircraft.

One of the more efficient cargo aircraft designs that has been employed has been the rear-door variety where an opening is provided at the aft end of the fuselage with a movable door to close such opening and to permit aerial delivery therethrough during flight as well as the initial loading operation. Necessarily, this location of the cargo door locates the empennage and the aft extremity of the aircraft above and further aft than it might otherwise be. This also results in a shortening of the cargo compartment floor at the aft end of the aircraft. Removal of the cargo from the aircraft during flight through the doorway therefore requires special design considerations and cargo removal equipment to ensure a clean and positive separation.

To this end, various cargo ejecting and extracting mechanisms have been proposed. These prior mechanisms, at best, complicate the operation by making an accurate delivery of the cargo to a surface target area more difficult. Also, they often require considerable manipulation of the cargo about the compartment to place it in the proper position for removal, as well as place personnel within the aircraft dangerously close to the open door. The amount of space internally of the aircraft required by such mechanisms and apparatus and their operation is usually not compatible with maximum cargo storage area.

The above and other shortcomings of known cargo removing means in aerial deliveries all are overcome by the apparatus proposed by the present invention. Essentially, this is accomplished by means of and through a composite loading, conveying and ejecting mechanism that comprises a compact unitary structure adapted to occupy an unobtrusive minimum area of the cargo compartment that is otherwise virtually unusable. The underlying concept is a cargo storage area that substantially includes the entire compartment and a movable loader that extracts a selected piece of the cargo from its stored location and conveys it to a delivery area substantially outside the aft door of the aircraft and where it is released for a clean and positive separation from the aircraft for relatively accurate delivery to a selected surface target area. This loader serves the additional purpose of facilitating the ground loading operation, i.e., the initial taking abroad and packing of the cargo in the aircraft.

More specifically, the mechanism herein proposed consists of an extensible and retractable overhead support adapted to be secured to the ceiling of the cargo compartment to extend in effect the entire length thereof. A carriage assembly is mounted on this support for relative movement to and from extreme positions at the forward end of the support and projecting from the aft end thereof beyond the effective area of the compartment. The carriage assembly includes hoisting means adapted to temporarily connect a selected piece of cargo and raise it from its stored position to a delivery position on the carriage where it is engaged and supported during its conveyance thereby to the extreme aft position of the carriage. Thus located, the cargo is ejected from the aircraft for ultimate delivery to a particular surface target area.

Additionally, the invention contemplates the ejection of multiple pieces of cargo in sequence, either at random or at predetermined intervals. Thus, the carriage includes a plurality of cargo engaging and supporting elements and a release for the successive actuation thereof to separate the several pieces of cargo therefrom.

With the above and other objects in view as will be apparent, this invention consists in the construction, combination and arragement of parts all as hereinafter more fully described, claimed and illustrated in the accompanying drawings wherein:

FIGURE 1 is a fragmentary side view of a cargo aircraft partly in section to reveal the interior thereof including the cargo storage area or compartment to show a loading, conveying and ejecting mechanism in accordance with the teachings of the invention operatively installed therein and disposed in the fully extended position with the carriage assembly thereof containing a plurality of cargo items nearing its extreme aft or delivery position, the first three items or packages having been released into the airstream from the carriage assembly where their positions prior to release are illustrated in phantom lines, the fully retracted or forward position of the mechanism being shown in phantom lines;

FIGURE 2 is a perspective view of the mechanism illustrated in FIGURE 1 with parts broken away or removed and shows primarily the hoisting means associated with the carriage assembly by which each item comprising the cargo is raised from its stored to its delivery position thereon and the power drives for both the hoisting means and the extension and retraction of the mechanism relative to the aircraft;

FIGURE 3 is a transverse section taken through the mechanism showing primarily the engaging and supporting means by which each item is attached to the carriage assembly and the release therefor, a fragment of one such item being shown in phantom lines;

FIGURE 4 is a section taken along line 4—4 of FIGURE 3 to show a lock to secure the cargo item in its engaged position on the carriage assembly and a release therefor, the disengaged position thereof being shown in phantom lines;

Figure 5:
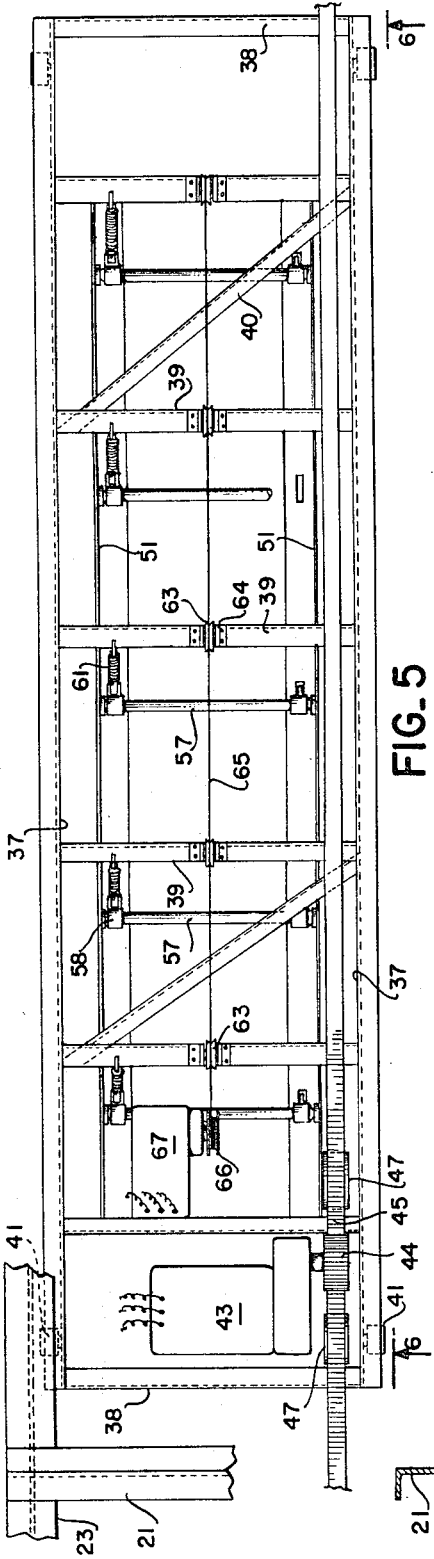
FIGURE 5 is a plan view of the carriage assembly and fragments of associated components of the mechanism to show the power drives carried thereby and operative to move it to and from its extreme positions as well as to actuate the cargo hoisting means.
Figure 6:
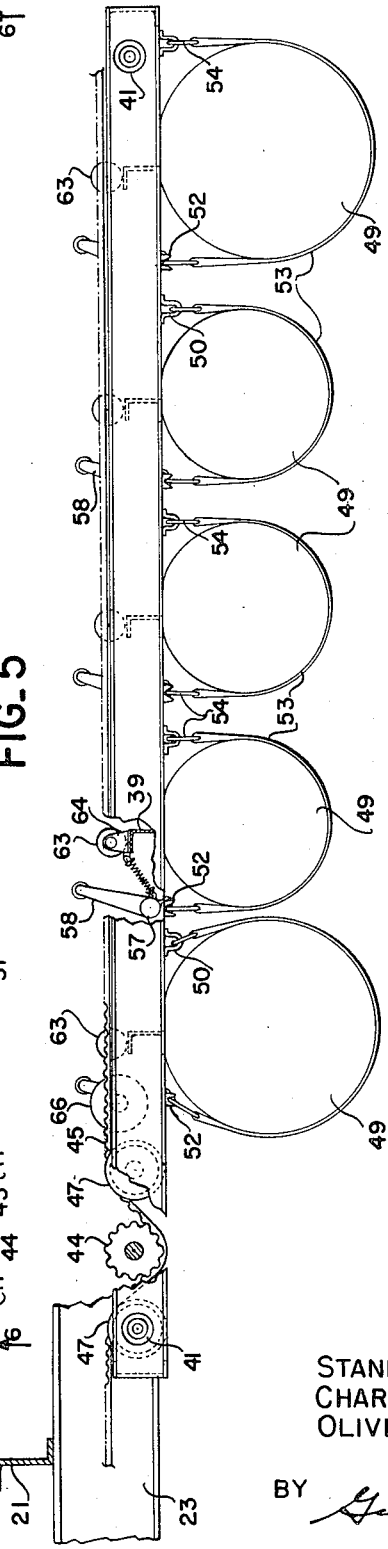
FIGURE 6 is a view taken along line 6—6 of FIGURE 5 with parts broken away to disclose underlying operating parts.

Referring more particularly to the drawings, 10 designates a portion of a cargo aircraft having a fuselage 11 containing an internal cargo storage area or compartment 12 and an empennage section 13. The compartment 12 is defined adjacent the bottom of the fuselage 11 by a floor or deck 14 and at the aft end thereof by a wall having an opening 15 therein adapted to be closed and sealed by a door 16. The door 16 is formed by two sections pivotally connected at their remote ends to fuselage structure by a hinge 17 and releasably connected one with the other at theid adjacent ends by any conventional means, such as overlapping engagements 18. Thus mounted, the door sections are adapted to swing in opposite directions whereby when opened the upper section is disposed internally of the aircraft adjacent the ceiling of the compartment 12 and the lower section extends outwardly of the aircraft with its upper surface disposed in the plane of the floor 14 forming a continuation thereof. Any conventional means is provided to secure the door sections in their open and closed positions.

The present cargo loading, conveying and ejecting mechanism is mounted overhead preferably on the ceiling of the compartment 12 and comprises a pair of fixed tracks 19 disposed in parallel, coextensive and spaced relation immovably secured to fuselage structure by means of and through suitable supports 20. Thus disposed the tracks 19 extend from the forward end of the compartment 12 aft as far as possible without interfering with the operation of the door 16 as above described. The full length of the tracks 19 is indicated by F in FIGURE 1.

Disposed between the tracks 19 is a movable track assembly 22 formed by a pair of coextensive spaced track elements 23 interconnected at their corresponding ends by rigid cross members 24 and intermediate rigid cross beams 21. The track assembly is adapted to be mounted on and supported by the fixed tracks 19 through rollers 25. The length of the track assembly 22 as determined by the length of its track elements 23 is appreciably less than that of the tracks 19 for reasons to become more apparent. The rollers 25 are carried by and project from each track 19 being disposed at spaced intervals along the length thereof to underlie a projecting flange 26 on the associated track element 23 to engage such flange 26 in opposition to a similar flange 27 on the adjacent track 19. If desired, a plurality of localized skids 28 fabricated of a nonabrasive material such as a phenolic block may be secured to each track assembly 22 to project both vertically and horizontally therefrom for contact with the surfaces of the associated track 19 to limit all relative lateral movement between the tracks 19 and 23. Thus, the movable track assembly 22 is mounted on the fixed tracks 19 for free and virtually unrestricted linear movement relative thereto.

Movement of the track assembly 22 on the fixed tracks 19 is controlled as well as limited by a gear reduction drive unit which may be an electrical motor 29 and an attached drive sprocket 30 mounted on fuselage structure at the forward end of the compartment 12. For this purpose a toothed belt 31 which may be fabricated of nylon reinforced rubber is secured as at 32 at one of its ends to the forward end of the movable track assembly 22 and passes around and engages the drive sprocket 30 and a driven sprocket 33 mounted in a fixed position on the fuselage structure adjacent the aft end of the compartment 12. At its other end this belt 31 is secured as at 34 to a cross beam 21 of the assembly 22. Guards 35 carried by the cross members 24 and/or 21 may be provided to retain the belt 31 in this position.

Hence, the belt 31 is equivalent to and functions like a chain to drive the movable track assembly 22 in either direction depending upon the rotation of the sprocket 30 by its motor 29. The location of the driven sprocket 33 is such to permit the track assembly 22 to extend beyond the aft end of the track 19 beneath the door 16 when open. The total travel of the track assembly 22 is indicated at M, FIGURE 1, which designates the location of the aft end thereof in its extreme positions.

Similarly mounted on the movable track assembly 22 and disposed between its track elements 23 is a carriage assembly 36 which is appreciably shorter than the track assembly 22 on which it is adapted to move linearly with virtually no restriction. More specifically, the carriage 36 is formed by a pair of spaced coextensive sides 37 interconnected at their corresponding ends by rigid cross members 38 and intermediate their ends by structural cross beams 39. If desired for additional structural integrity diagonal cross beams 40 may be employed between some or all of the cross beams 39.

A plurality of spaced rollers 41 are mounted on each side 37 to project therefrom with their peripheral surfaces resting on a flange 42 extending from the associated track element 23. The carriage 36 is thereby supported on the movable track assembly 22 which in turn is supported on the fixed tracks 19 as above described to produce a composite structure adapted to be installed on the fuselage structure and form an integral part thereof. Thus mounted, the carriage assembly 36 has an effective travel C that extends virtually the entire length of the compartment 12 and in its extreme aft position is disposed substantially outside the compartment 12 clear of the aircraft rear structure. By locating the carriage assembly 36 and its supporting track assembly 22 and fixed tracks 19 at the transverse center of the compartment 12 to be disposed longitudinally thereof, this movement of the carriage 36 makes it readily accessible to each piece of cargo stored within the compartment 12.

In order to drive the carriage assembly 36 linearly in the track assembly 22 as described, a power unit such as an electric motor 43 is mounted in any conventional manner to the forward end of the carriage assembly 36 with an associated drive sprocket 44 extending therefrom. The teeth of the sprocket 44 are adapted to engage a toothed belt 45 which extends the length of the track assembly 22 being secured as at 45' at its opposite ends to the inner face of the cross members 24 thereof and if desired passing through guards 46 the full equivalent of those 35 which may be associated with the belt 31 as set forth above.

Also mounted on and carried by the carriage 36 is a pair of idler gears 47 one disposed on either side of the sprocket 44 and in the plane of the belt 45 to receive and pass it thereover in opposition to the sprocket 44 and thereby provide the maximum of engagement therebetween. The belt 45 and sprocket 44 thus constitute in effect a rack and pinion for the movement of the carriage assembly 36 both fore and aft on the track assembly 22 depending upon the direction of rotation of the sprocket 44 by its motor 43. If desired skid blocks 48 like those 28 previously described may be provided on the sides 37 to limit all relative lateral movement between the carriage assembly 36 and the track assembly 22.

Associated with each of the cross beams 39 is a releasable cargo mounting attachment operative to secure a piece of cargo or bundle 49 to the carriage assembly 36. Each such attachment comprises a pair of transversely aligned ring-retaining fittings 50 secured to the carriage 36 through a supporting rib 51 connected in any conventional manner between each of the adjacent cross beams 39 at their corresponding ends and a pair of transversely aligned ring guides 52 similarly secured to each rib 51. The retainers 50 and guides 52, associated with each bundle 49, are disposed on either side thereof. A strap 53 of elastic or resilient material terminating at each of its ends in a ring 54 one adapted to be permanently retained in a retainer 50 and the other adapted to be releasably retained in the associated guide 52 by a hook 55 serves as a sling to support and maintain each bundle 49 in snug engagement against the under side of the carriage 36.

To this end, each hook 55 is pivotally mounted as at 56 on its rib 51 to project therefrom and engage the associated ring 54 in opposition to its associated guide 52. Each pair of transversely aligned hooks 55 is interconnected for rotation in unison through a torque tube 57 and one of the hooks 55 terminates in a trip lever 58 projecting therefrom in opposition to the hook 55. The trip lever 58 is disposed in the plane of a lug 59 carried by and depending from one of the beams 21 and is normally disposed in a generally vertical position by a compression spring 60 to strike the lug 59 when the carriage 36 moves linearly of the track assembly 22.

The compression spring 60 is mounted on, being disposed around, a telescoping guide link 61 pivotally connected at one end to the carriage structure through a bracket 62 and at its other end to the hook 55. The link 61 is disposed off-center with relation to the pivot 56 whereby the spring 60 is free to act on and against the lever 58 in both of its extreme positions engaging and disengaging the ring 54 whereby it serves to lock the hook 55 in each such position. When the lever 58 strikes the lug 59 during movement of the carriage 36 relative to the track assembly 22 in an aft direction, the companion hooks 55 are rotated thereby against the normal action of spring 60 away from their respective ring guides 52 and simultaneously release both rings 54 and the associated bundle 49. The hooks 55 are maintained in this released position until subsequently actuated to engage another bundle 49 where they are held by their spring 60 until tripped by the lug 59 as before.

Rotatably mounted on each cross beam 39 having a cargo mounting attachment associated therewith is a pulley 63 disposed in an upright position on a bracket 64 secured to the beam 39 with its periphery extending beyond the edge of the beam and substantially vertically above the center of the bundle 49. Each such pulley 63 is adapted to receive and pass a cable 65 wound on a reel 66 secured to the forwardmost beam 39 of carriage assembly 36 and power-driven or rotated by a geared motor 67. At its outer end the cable 65 terminates in engaging means in the form of a hook 68 or the like capable of being attached to a selected bundle 49 in its stored position within the compartment 12. Upon operation of the geared motor 67 in the proper direction, the selected bundle 49 is raised thereby to a position adjacent the carriage 36 to which it is secured by the straps 53 as above described.

In order to maintain the cable 65 properly on each pulley 63 a ball lock pin 69 is employed. This pin 69 is removably connected to each bracket 64 with its shank overlying the cable 65 when disposed over the pulley 63 to act as a keeper therefor and to allow insertion and removal of the cable 65 therein whereby a single cable is employed to install each bundle 49 on the carriage 36.

In view of the foregoing construction and arrangement of the loading, conveying and ejecting mechanism herein proposed, it is apparent that maximum use of the cargo compartment 12 is realized. The individual pieces that comprise the total cargo are readily accessible to this mechanism for pickup from their stored location and conveyance to their delivery station at the extreme aft end of the aircraft 10. This delivery station is effectively beyond the limits of the compartment 12 where a clean and positive ejection of the cargo is assured.

While a particular embodiment of the invention has been hereinabove illustrated and described, the underlying concept admits to various modifications which will be apparent to those skilled in the art without departing from the true spirit and scope of the invention. The appended claims are intended to cover all such variations and modifications or their equivalents and to define the limitations of the invention.

What is claimed is:

1. A cargo loading, conveying and ejecting mechanism for aircraft having a storage area therein comprising:
   an overhead track assembly mounted within the aircraft and operable to and from retracted and extended positions corresponding respectively to locations at a loading station within said storage area; and a delivery station externally of said storage area, said track assembly including a pair of fixed, parallelly disposed, spaced tracks extending substantially the full length of said storage area, a movable track assembly formed by a pair of spaced, interconnected track elements slidably mounted on said fixed tracks and capable of extending beyond said fixed tracks to establish the delivery station aforesaid and a movable carriage formed by a pair of spaced, interconnected sides slidable on said track elements throughout the length thereof;
   connection means to secure said cargo to said carriage; and
   a release operable on said connection means when said carriage is disposed at said delivery station.

2. The mechanism of claim 1 including skid blocks fabricated of nonabrasive material disposed between said movable tracks and said fixed tracks and between said carriage and said movable tracks to prevent all relative lateral movement therebetween.

3. The mechanism of claim 1 including a first drive belt secured at its ends to opposite corresponding ends of said movable tracks and in engagement with drive means therefor secured to the aircraft and disposed medially of said opposite corresponding ends, and a second drive belt secured at its ends to opposite corresponding ends of said movable tracks and in engagement with drive means therefor secured to said carriage and disposed medially thereof.

4. The mechanism of claim 1 including cargo hoisting means carried by said carriage adapted to engage cargo located within said storage area and raise it to said carriage, said hoisting means including a cable carried by said carriage and power means for the extension and retraction of said cable relative to said carriage.

5. The mechanism of claim 4 including roller means disposed at spaced locations on said carriage along the length thereof and in the line of travel of said cable.

6. The mechanism of claim 1 wherein said connection means includes a pair of spaced hooks interconnected one with the other for actuation in unison.

7. The mechanism of claim 1 wherein said release includes a lever extending from said connection means and a lug located at said delivery station and disposed in the path of movement of said lever.

8. The mechanism of claim 7 including biasing means operative on said lever tending to retain it in each of its extreme positions corresponding to cargo securing and cargo releasing respectively.

9. The combination with an aircraft having a fuselage and a cargo compartment within said fuselage terminating in an opening at the aft end thereof for the discharge of cargo from the aircraft during flight, of an overhead track mounted on the ceiling of said compartment extending substantially the entire length thereof, a carriage movable on said track the entire length thereof and beyond to be suspended outwardly of said compartment, cargo hoisting means carried by said carriage adapted to releasably engage cargo within said compartment and raise it to said track, a connector carried by said carriage to secure said cargo thereto when in the raised position aforesaid, and a release for said connector automatically operable when the carriage reaches a predetermined position in its movement in an aft direction on said track.

10. The combination of claim 9 wherein said track includes a pair of sections each formed by a pair of coextensive tracks interconnected by at least one rigid cross member and telescopically arranged one within the other and power means for the extension and contraction thereof.

References Cited
UNITED STATES PATENTS

| | | | |
|---|---|---|---|
| 2,684,218 | 7/1954 | Cozzoli | 244—137 |
| 2,692,744 | 10/1954 | Burkhead | 244—137 |
| 3,028,130 | 4/1962 | Burton | 244—137 X |
| 3,065,934 | 11/1962 | Jackson | 244—137 X |
| 3,093,031 | 6/1963 | Damm | 244—137 X |

FERGUS S. MIDDLETON, *Primary Examiner.*